US010422323B2

(12) United States Patent
Sandvad et al.

(10) Patent No.: US 10,422,323 B2
(45) Date of Patent: Sep. 24, 2019

(54) METHOD OF REPLACING ANCHOR BOLTS IN WIND TURBINE FOUNDATIONS

(71) Applicant: Vestas Wind Systems A/S, Aarhus N. (DK)

(72) Inventors: Ingemann Hvas Sandvad, Ringkøbing (DK); Søren P. Jensen, Varde (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 16/064,171

(22) PCT Filed: Feb. 2, 2017

(86) PCT No.: PCT/DK2017/050023
§ 371 (c)(1),
(2) Date: Jun. 20, 2018

(87) PCT Pub. No.: WO2017/133744
PCT Pub. Date: Aug. 10, 2017

(65) Prior Publication Data
US 2018/0355853 A1     Dec. 13, 2018

(30) Foreign Application Priority Data

Feb. 5, 2016 (DK) ............................ PA 2016 70064

(51) Int. Cl.
*F03D 80/50* (2016.01)
*E02D 27/42* (2006.01)
(Continued)

(52) U.S. Cl.
CPC .......... *F03D 80/50* (2016.05); *E02D 27/425* (2013.01); *E02D 37/00* (2013.01); *F03D 13/22* (2016.05);
(Continued)

(58) Field of Classification Search
CPC ....... F05B 2260/301; F05B 2260/3011; E02D 27/425
See application file for complete search history.

(56) References Cited

U.S. PATENT DOCUMENTS 5,379,563 A * 1/1995 Tinsley ................... E02D 27/44
                                                                248/679
5,826,387 A * 10/1998 Henderson .............. E02D 27/42
                                                                52/295
(Continued)

FOREIGN PATENT DOCUMENTS

CN        101360878 A        2/2009
CN        203925895 U        11/2014
(Continued)

OTHER PUBLICATIONS

European Patent Office, International Search Report and Written Opinion in PCT Application No. PCT/DK2017/050023, dated May 3, 2017.

(Continued)

*Primary Examiner* — Babejide A Demuren
(74) *Attorney, Agent, or Firm* — Wood Herron & Evans LLP (57) ABSTRACT

A method of replacing an anchor bolt used to support a wind turbine to a foundation. The method includes providing the wind turbine and the foundation supporting the wind turbine. The foundation includes a lower base flange, at least one anchor bolt extending between the lower base flange and a lower tower flange of the wind turbine, and a rigid body at least partially formed around the at least one anchor bolt. The method further includes drilling a core in the lower tower flange and the rigid body circumferentially around the anchor bolt and removing the anchor bolt and the core to create a cavity. The method further includes inserting a replacement anchor bolt into the cavity and coupling the (Continued)

replacement anchor bolt to the lower base flange. The replacement anchor bolt may then be tensioned.

19 Claims, 10 Drawing Sheets

(51) Int. Cl.
  *F03D 13/20* (2016.01)
  *E02D 37/00* (2006.01)
(52) U.S. Cl.
  CPC ..... *F05B 2230/80* (2013.01); *F05B 2240/912* (2013.01); *F05B 2260/301* (2013.01); *Y02E 10/728* (2013.01); *Y02P 70/523* (2015.11)

(56) References Cited

U.S. PATENT DOCUMENTS

| | | | | |
|---|---|---|---|---|
| 7,707,797 B2* | 5/2010 | Henderson | ............... | E02D 27/42 405/232 |
| 7,805,895 B2* | 10/2010 | Kristensen | ............... | E02D 27/42 52/169.6 |
| 8,887,451 B2* | 11/2014 | Gregory | ............... | E04G 23/065 405/232 |
| 2011/0138706 A1 | 6/2011 | Voss et al. | | |
| 2012/0260592 A1 | 10/2012 | Wolf | | |
| 2013/0255169 A1 | 10/2013 | Henderson | | |

FOREIGN PATENT DOCUMENTS

| | | |
|---|---|---|
| DE | 102009016893 | 10/2010 |
| JP | 2010229747 A | 10/2010 |

OTHER PUBLICATIONS

Danish Patent and Trademark Office, Search and Examination Report in PA 2016 70064, dated Sep. 14, 2016.
Heinz Bloch et al, "They", ISBN 978-0-7506-7726-4, (Nov. 26, 2004), pp. 80-84, URL: https://www.elsevier.com/books/machinery-component-maintenance-and-repair/bloch/978-0-7506-7726-4, (Apr. 21, 2017), XP055366332 [Y] 1,6,8,9,11-13 * pp. 80,81 * * figures 3.7,3.8 *.
China National Intellectual Property Administration, First Notification of Office Action in CN Application No. 201780009228.9, dated Apr. 30, 2019.

* cited by examiner

METHOD OF REPLACING ANCHOR BOLTS IN WIND TURBINE FOUNDATIONS

TECHNICAL FIELD

The present invention relates generally to wind turbines, and more particularly to methods of replacing one or more anchor bolts in a foundation used to support the wind turbine.

BACKGROUND

Wind turbines are used to produce electrical energy using a renewable resource and without combusting a fossil fuel. Generally, a wind turbine converts kinetic energy from the wind into electrical power. A horizontal-axis wind turbine generally includes a tower, a nacelle located at the apex of the tower, and a rotor having a plurality of blades and supported in the nacelle by a shaft. The shaft couples the rotor either directly or indirectly with a generator, which is housed inside the nacelle. Consequently, as wind forces the blades to rotate, electrical energy is produced by the generator.

Horizontal-axis wind turbines may be anchored on land by securing a lower portion, such as a lower tower flange, of the wind turbine tower to a foundation that extends into the ground. Foundations are designed to far exceed the life expectancy of the various wind turbine components, since replacement or repair is expensive and/or difficult. Conventional foundations include steel-reinforced concrete structures arranged within an excavation pit. The structure includes a centrally positioned steel anchor cage that is generally cylindrical and includes upper and lower annular steel flanges arranged horizontally, and a plurality of high-strength steel anchor bolts extending vertically between the flanges.

Securing the tower of the wind turbine to the anchor bolts causes the anchor bolts to be placed under increased stress. However, like many structural components, the anchor bolts are conservatively designed with a built-in factor of safety designed to withstand such stresses. However, if the anchor bolts do not maintain sufficient post-tensioning, the anchor bolts may begin to loosen. As used herein, post tensioning means to maintain the foundation under high compression, thereby enabling the foundation to suitably withstand various forces and moments exerted by the wind turbine during operation.

A period of time after the wind turbine is installed and operational (for example, three or four years), inspectors and/or operators of the wind turbine may detect that one or more of the anchor bolts is no longer sufficiently post-tensioned. Insufficient post-tensioning may cause the anchor bolts to move within the concrete foundation. This may be visually apparent through cracks propagating in the concrete foundation over time. Left unchecked, if the anchor bolts loosen to below a certain post-tensioning value, the resulting weakening of the concrete foundation may reduce of the life expectancy of the concrete foundation supporting the wind turbine.

For example, with sufficient weakening, the life expectancy of the foundation may be on the order of the life expectancy of the wind turbine itself. Thus, there may be some instances where the wind turbine foundation will have to be repaired or replaced to realize the full life expectancy of the wind turbine. However, repairing or replacing the foundation after wind turbine assembly and operation is costly and time-consuming, and cannot generally be performed while the wind turbine is actively operating (where the blades are actively rotating) or in standstill mode (where the blades are not rotating). Instead, repairing or replacing the foundation after wind turbine assembly currently requires that the tower be removed from the foundation.

Accordingly, there is a need for an improved method of repairing a wind turbine foundation. More particularly, there is a need for an improved method of replacing the one or more anchor bolts of the wind turbine foundation after the wind turbine is assembled, without the need for time-consuming or costly disassembly of the wind turbine.

SUMMARY

A method of replacing an anchor bolt used to support a wind turbine to a foundation is described according to various exemplary embodiments. The method includes providing the wind turbine and the foundation supporting the wind turbine. The foundation includes a lower base flange, at least one anchor bolt extending between the lower base flange and a lower tower flange of the wind turbine, and a rigid body at least partially formed around the at least one anchor bolt. The method further includes drilling a core in the lower tower flange and the rigid body circumferentially around the anchor bolt for at least a portion of the length of the anchor bolt and removing the anchor bolt and the core to create a cavity. The method further includes inserting a replacement anchor bolt into the cavity and coupling the replacement anchor bolt to the lower base flange. The replacement anchor bolt may then be tensioned.

In some embodiments, coupling the replacement anchor bolt to the lower base flange further includes coupling the replacement anchor bolt to an insert and coupling the insert to the lower base flange. The coupling of the replacement anchor bolt to the insert may be performed prior to coupling the insert to the lower base flange.

In some embodiments, coupling the replacement anchor bolt to the lower base flange further includes cutting internal threads into a bolt bore of the lower base flange, threadably coupling external threads of the replacement anchor bolt to internal threads of the insert, and threadably coupling external threads of the insert to the internal threads of the lower base flange. The insert may be, for example, a helicoil.

In some embodiments, the tensioning step includes inserting a replacement bolt washer and a replacement bolt nut to tension the replacement anchor bolt and enclose the cavity.

In some embodiments, the foundation further includes an anchor cage. The anchor cage includes an upper load distribution flange, the lower base flange, and the plurality of anchor bolts extending therebetween and at least partially formed within the rigid body. In some embodiments, the drilling step further includes drilling the core in the lower tower flange, the upper load distribution flange, and the rigid body circumferentially around the anchor bolt until contacting the lower base flange.

In some embodiments, the method includes vacuuming out the cavity, prior to inserting the replacement anchor bolt and/or determining whether an anchor bolt is sufficiently post-tensioned using an ultrasound device prior to drilling a core in the lower tower flange. In some embodiments, the method further includes casting the cavity with a cementitious material.

In some embodiments, one or more of the recited steps may be performed while the wind turbine is actively operating or in standstill mode, both of which do not require that the tower be removed from the foundation. This includes performing one or more of the steps while the wind turbine is actively operating and performing one or more steps while the wind turbine is in standstill mode. In some embodiments, the method may be performed on at least two anchor bolts.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings. The accompanying drawings, which are incorporated in and constitute a part of this specification, illustrate one or more embodiments of the invention and, together with the general description given above and the detailed description given below, serve to explain the one or more embodiments of the invention.

DETAILED DESCRIPTION

Figure 1:
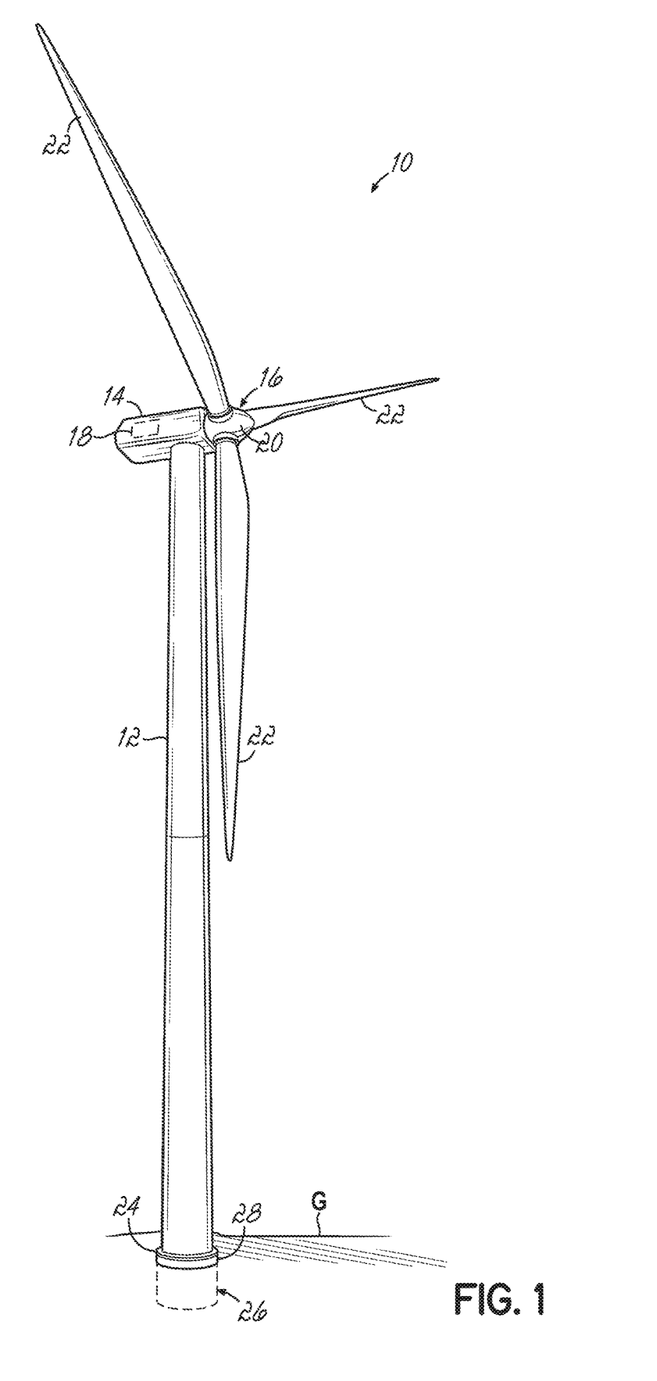
FIG. 1 is a perspective view of a wind turbine coupled to an exemplary foundation, shown schematically.

Referring to the figures, and to FIG. 1 in particular, an exemplary horizontal-axis wind turbine 10 generally includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14. The tower 12 further operates to elevate the nacelle 14 and the rotor 16 to a height above ground level or sea level, as may be the case, at which faster moving air currents of lower turbulence are typically found.

The rotor 16 of the wind turbine 10 serves as the prime mover for the electromechanical system. Wind exceeding a minimum level will activate the rotor 16 and cause rotation in a substantially perpendicular direction to the wind direction. The rotor 16 of wind turbine 10 includes a central hub 20 and a plurality of blades 22 that project outwardly from the central hub 20 at locations circumferentially distributed thereabout. While the exemplary rotor 16 shown herein includes three blades 22, various alternative quantities of blades 22 may be provided. The blades 22 are configured to interact with the passing air flow to produce lift that causes the rotor 16 to spin generally within a plane defined by the blades 22.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

As shown in FIG. 1, the wind turbine 10 is anchored to a ground surface G by securing a lower tower flange 24 of the tower 12 to a foundation 26, shown schematically. The foundation 26 is recessed in an excavation pit, or void, formed in the ground G. The foundation 26 and related components and steps of formation are now described according to exemplary embodiments of the invention.

Figure 2:
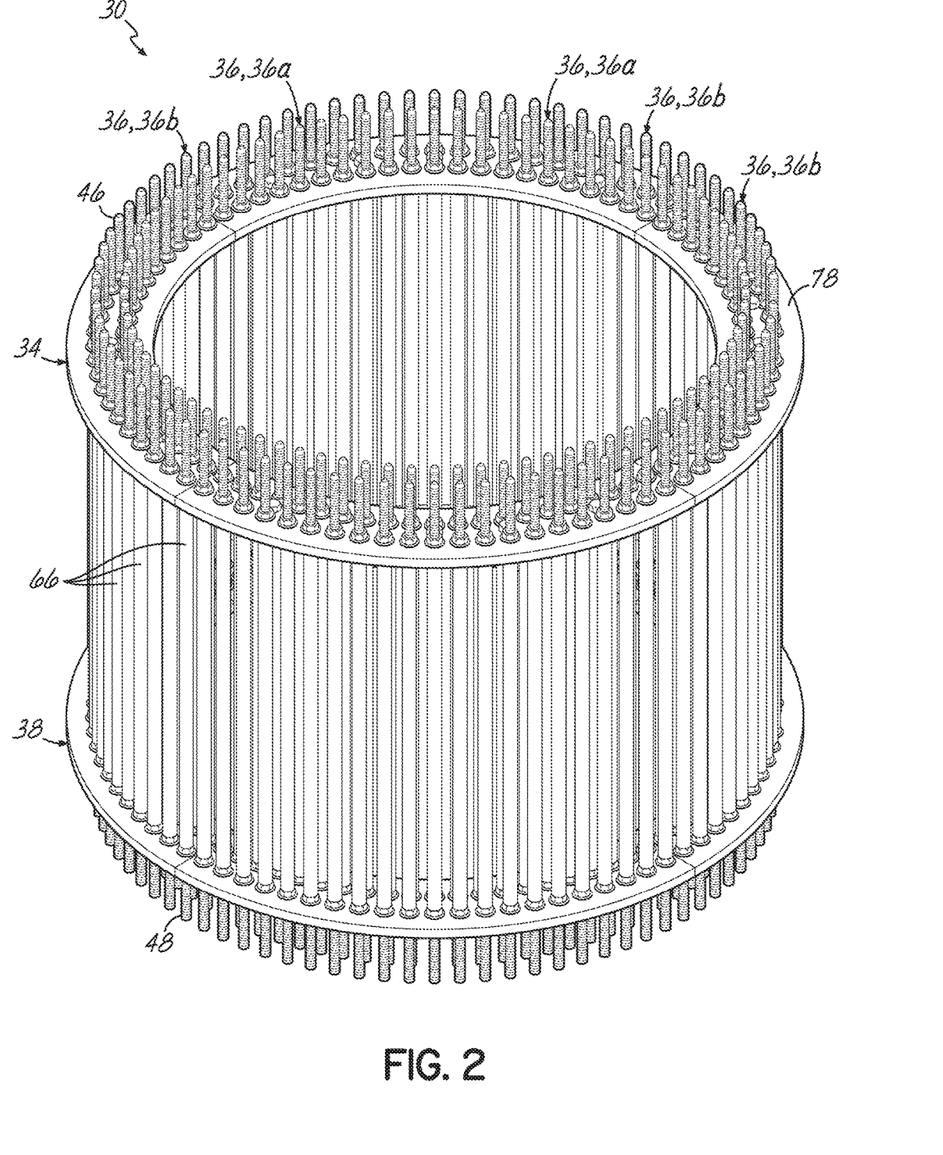
FIG. 2 is a perspective view of an anchor cage for use with a wind turbine foundation according to an exemplary embodiment of the invention.

Referring to FIG. 2, formation of the foundation 26 begins with the assembly of the anchor cage 30, which may be performed at the wind turbine installation site. As shown in FIG. 2, the assembled anchor cage 30 is generally cylindrical and includes the upper load distribution flange 34, a lower base flange 38, and a plurality of circumferentially spaced anchor bolts 36 extending between the upper load distribution flange 34 and the lower base flange 38. The upper load distribution flange 34 and lower base flange 38 may be arranged generally horizontally, while the anchor bolts 36 extend generally vertically and couple the upper load distribution flange 34 to the lower base flange 38. The upper load distribution flange 34 and the lower base flange 38 may be generally circular, and in particular annular, for example. According to one embodiment, the components of the anchor cage 30 may be formed of high strength steel, for example.

The completed foundation 26 generally includes a rigid body 28, an anchor cage 30 at least partially embedded within and reinforcing the rigid body 28, and may further include a grout support layer (not shown) positioned between the upper load distribution flange 34 of the anchor cage 30 and an upper surface of the rigid body 28.

In exemplary embodiments, the anchor cage 30 may include approximately 64 to 200 radial pairs of anchor bolts 36 and corresponding bolt bores 44 formed on each of the upper load distribution flange 34 and the lower base flange 38. In the illustrated exemplary embodiment shown in FIG. 2, the anchor cage 30 includes 84 radial pairs of anchor bolts 36. It will be appreciated that other quantities of anchor bolts 36 and bolt bores 44 are intended. Additionally, according to one exemplary embodiment, the anchor bolts 36 are up to 4.5 meters long and 42 millimeters in diameter. However, other dimensions are also possible.

Figure 3A:
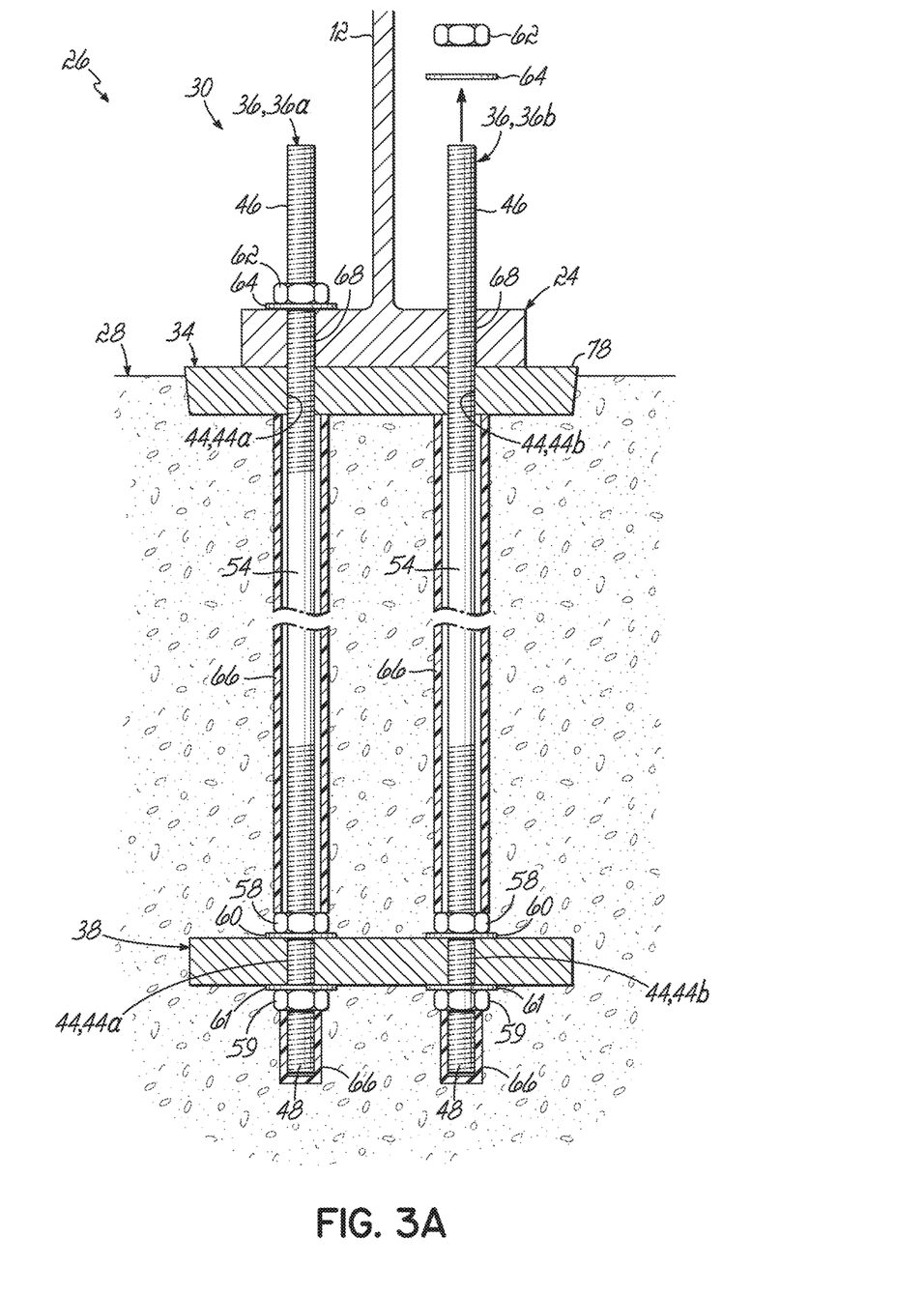
FIG. 3A is an upper radial cross-sectional view of a wind turbine foundation according to an exemplary embodiment of the invention, the foundation including a rigid body reinforced by the anchor cage of FIG. 2, with the anchor cage showing a radial pair of anchor bolts received within protective tubes.

FIG. 3A shows a radial pair of anchor bolts 36 of a representative circumferential portion of the anchor cage 30. Each anchor bolt 36 extends longitudinally and includes a threaded upper end 46, a threaded lower end 48, and a central shank 54. Prior to assembling the anchor bolts 36 with the upper load distribution flange 34 and the lower base flange 38, the threaded upper end 46 of each anchor bolt 36 may be sealed with a protective covering (not shown), such as tape or a heat shrink hose for example.

The upper load distribution flange 34 includes a plurality of circumferentially spaced bolt bores 44 through which threaded upper ends 46 of the anchor bolts 36 are received. It will be appreciated that the lower base flange 38 likewise includes a corresponding plurality of bolt bores 44 through which threaded lower ends 48 of the anchor bolts 36 are received. The bolt bores 44 are arranged into a radially inner ring 44a for receiving a radially inner anchor bolt 36a of the anchor bolts 36, and a radially outer ring 44b for receiving a radially outer anchor bolt 36b of the anchor bolts 36. The radially inner and the radially outer rings 44a, 44b may be radially aligned with one another such that the bolt bores 44 and respective anchor bolts 36 are arranged into circumferential spaced radial pairs, as best shown in FIG. 2. The bolt bores 44 may be uniformly spaced circumferentially around the upper load distribution flange 34 and the lower base flange 38.

During assembly, the threaded lower end 48 of the anchor bolt 36 is passed through a bolt bore 44 of the lower base flange 38, and is secured thereto using upper and lower base nuts 58, 59 and upper and lower base washers 60, 61 that clamp the lower base flange 38 therebetween. In an alternative embodiment, the upper base nut 58 and the upper washer 60 on the upper side of the lower base flange 38 may be omitted. In a similar manner, the threaded upper end 46 of the anchor bolt 36 is passed through a corresponding bolt bore 44 of the upper load distribution flange 34, and is secured thereto using an upper nut 62 and an upper washer 64.

With continued reference to FIG. 3A, the portion of the anchor bolt 36 extending between the upper load distribution flange 34 and the lower base flange 38 may be encased within a protective tube 66, such as a PVC pipe or a heat shrink hose, for example. An additional protective sleeve may be placed on the portion of the anchor bolt 36 extending below the lower base flange 38. Advantageously, the protective tubes 66 may substantially shield the anchor bolts 36 from undesired contact and bonding with concrete (i.e., a material that forms rigid body 28) during the pouring and curing steps. In an exemplary embodiment, a pair of radial pair of support sleeves (not shown) may be substituted for the protective tubes 66 at select circumferential locations within the anchor cage 30, for enhancing internal structural support within the foundation 26.

While not shown, the excavation pit may be lined with a form, such as large diameter piping, for defining an outer side surface of the foundation 26. Following final positioning of the anchor cage 30 within the excavation pit high strength concrete is poured into the excavation pit so that the pit fills up to approximately an upper surface 78 of the upper load distribution flange 34. Accordingly, the anchor cage 30 is substantially embedded within the concrete. The poured concrete is then allowed a suitable length of time to adequately cure to form a rigid body 28. The concrete may be allowed approximately 48 hours to cure. Protective tubes 66 and support sleeves substantially shield the anchor bolts 36 from undesired contact with the concrete.

Prior to mounting the wind turbine 10 to the foundation 26, the upper nuts 62 and upper washers 64 provided on the threaded upper ends 46 of the anchor bolts 36 are removed. The wind turbine 10 is coupled to the foundation 26 by aligning mounting bores 68 in the lower tower flange 24 with the threaded upper ends 46 of the anchor bolts 36. The lower tower flange 24 is coupled to anchor bolts 36 of the anchor cage 30 and is directly supported by the upper load distribution flange 34. The tower 12 is then lowered until the lower tower flange 24 directly contacts and is supported by the upper load distribution flange 34. Sets of upper nuts 62 and upper washers 64, which may be new sets not used during formation of the foundation 26, are then applied to the threaded upper ends 46. The upper nuts 62 are then tightened to a suitable torque. In this manner, the anchor bolts 36 are post-tensioned. It may be desirable to provide a grout support layer between the upper load distribution flange 34 and the rigid body 28 in order to facilitate load transfer from the wind turbine 10 to the foundation 26, while maintaining a rigid metal-to-metal interface between the foundation 26, via the upper load distribution flange 34, and the wind turbine 10.

Advantageously, the exemplary embodiments of the invention shown and described herein provide unique features and steps for replacing one or more anchor bolts 36. This invention may be carried out while the wind turbine 10 is actively operating or while the wind turbine 10 is stopped. Replacing one or more anchor bolts 36 while the wind turbine 10 is actively operating eliminates down-time of the wind turbine 10.

Referring to FIGS. 3A-3G, exemplary steps for replacing an anchor bolt 36 with a replacement anchor bolt 80 are shown. Advantageously, the exemplary embodiments of the invention described below provide steps and components for achieving these objectives. It will be understood that the replacement steps described below may be similarly performed on other anchor bolts 36 as desired. Additionally, while FIGS. 3A-3G show the replacement of a radially outer anchor bolt 36b of the anchor bolts 36, the inventive method also applies to replacing a radially inner anchor bolt 36a of the anchor bolts 36. For this reason, reference is generally made to anchor bolt 36.

Determining whether one or more anchor bolts 36 are insufficiently post-tensioned may be performed using various known measurement devices, such as an ultrasound device (not shown), for example. The measurement device enables an operator and/or inspector to determine whether one or more anchor bolts 36 needs to be replaced. Once it is determined that a particular anchor bolt 36 needs to be replaced, the upper nut 62 and the upper washer 64 may be removed as shown in FIG. 3A according to one exemplary embodiment. Alternatively, according to another exemplary embodiment, the upper nut 62 and the upper washer 64 may remain coupled to the anchor bolt 36.

Figure 3B:
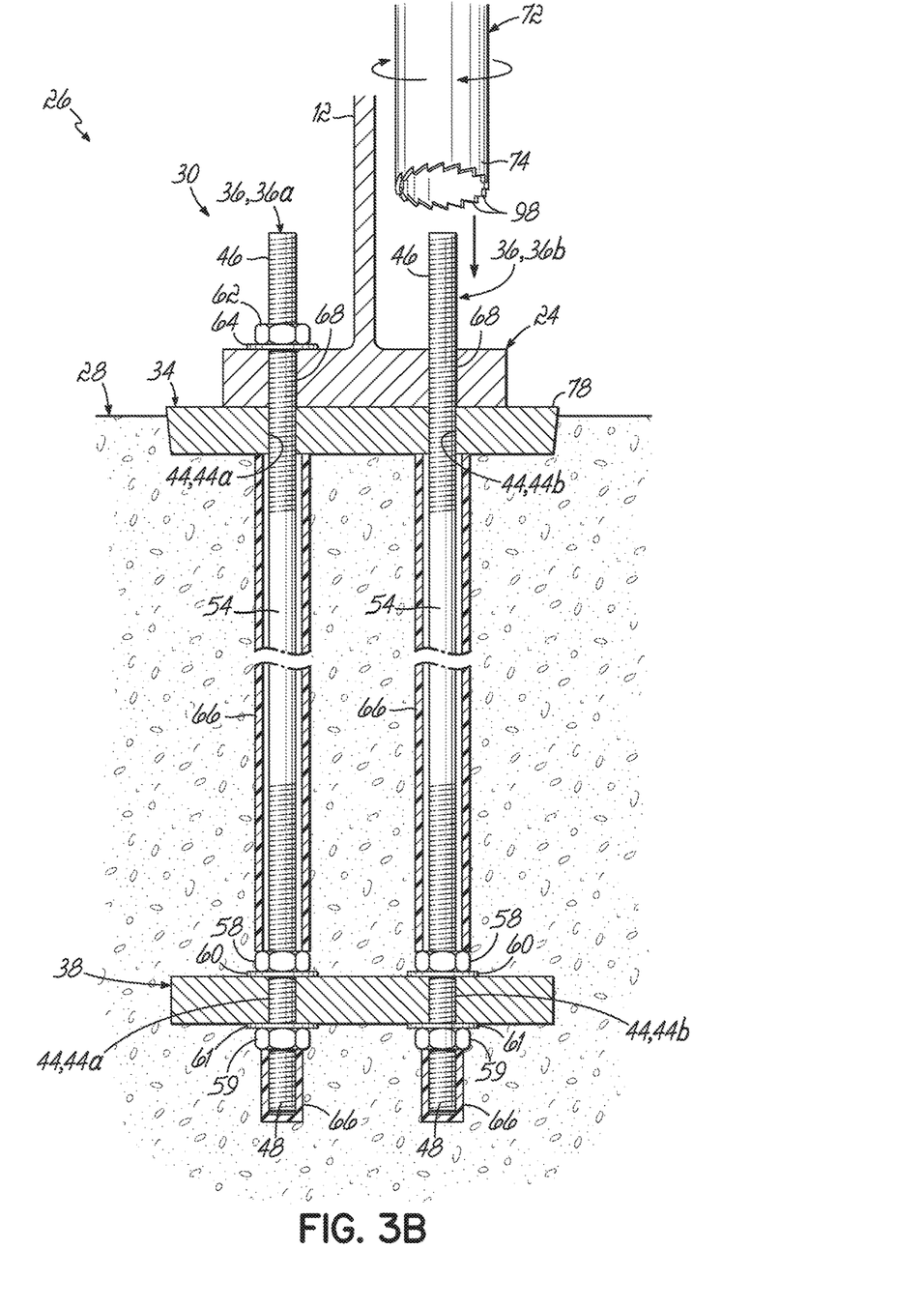
FIG. 3B is an upper radial cross-sectional view similar to FIG. 3A, showing a drilling device having a rotating drill bit.

FIG. 3B schematically shows a drilling device 72 and a drill bit 74 attached to the end of the drilling device 72 being lowered circumferentially around the anchor bolt 36 toward the lower base flange 38. Drilling devices, such as drilling device 72, are generally well-known in the art, and as a result, will not be described in greater detail herein. Further, one skilled in the art would appreciate that a variety of drilling devices 72 and accompanying drill bits 74 are suitable depending on the desired size of the cavity 42, the material to be penetrated, the thicknesses of the lower tower flange 24 and/or the upper load distribution flange 34, along with other known variables. Further, one skilled in the art would appreciate that a variety of lubricants may be used to aid in the drilling process. These lubricants may reduce friction, remove shavings, and/or reduce heat associated with the drilling process.

Figure 3C:
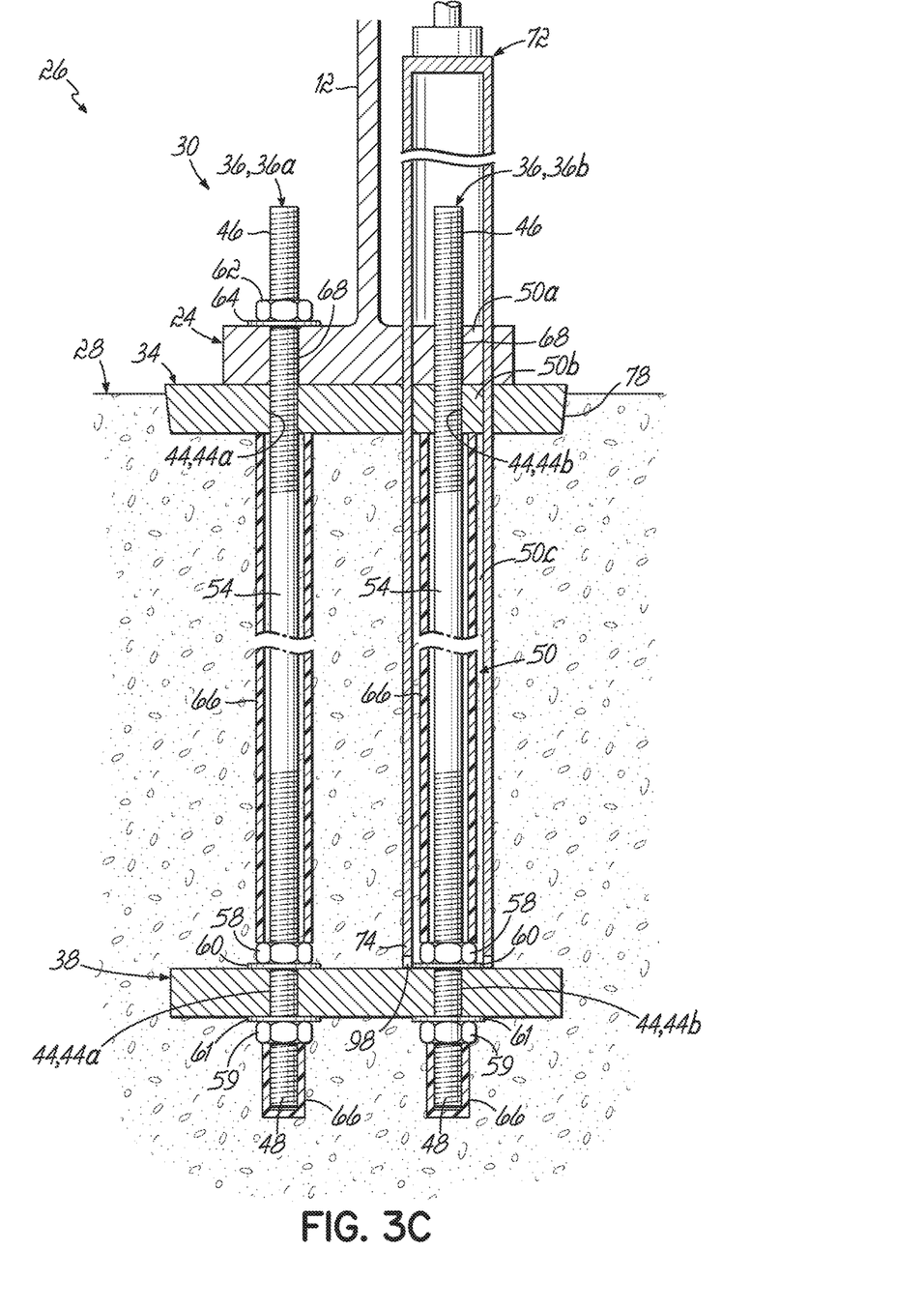
FIG. 3C is an upper radial cross-sectional view similar to FIG. 3B, showing the drill bit encircling the core containing the anchor bolt and contacting the lower base flange of the anchor cage.

FIG. 3C shows a core 50 drilled through the lower tower flange 24 creating a lower tower flange core 50*a*, through the upper load distribution flange 34 creating an upper load distribution flange core 50*b*, and through the rigid body 28 creating a rigid body core 50*c* until contacting the lower base flange 38. While in this embodiment, the core 50 includes the lower tower flange core 50*a*, the upper load distribution flange core 50*b*, and the rigid body core 50*c*, the core 50 according to other embodiments may include more or less layers. According to one exemplary embodiment, after drilling through the lower tower flange 24 and/or the upper load distribution flange 34, the drilling device 72 may be stopped for lower tower flange core 50*a* and/or the upper load distribution flange core 50*b* to be removed, for a different drilling device to be used and/or for a different drill bit 74 to be inserted into the drilling device 72. Alternatively, the same drilling device 72 and/or the same drill bit 74 may be used to create rigid body core 50*c* through the rigid body 28 forming a portion of the foundation 26.

With continued reference to FIG. 3C, the drilling device 72 and accompanying drill bit 74 may penetrate through the rigid body 28 along the anchor bolt 36 distally toward to the lower base flange 38. As shown, the core 50 completely circumferentially surrounds the anchor bolt 36. More specifically, due to the length of anchor bolt 36, in some cases 4.5 meters long, the drill bit 74 has a plurality of 0.5 meter segments (not shown) linked together with an internal thread for assembly. Segmented drill bits, such as drill bit 74, are generally well-known in the art, and as a result, will not be described in greater detail herein. The segments allow for the drilling device 72 to reach the lower base flange 38, without the need for inserting and removing the entire drilling device 72. Additionally, the drill bit 74 may have a diamond coating to more easily and/or quickly penetrate through the rigid body 28.

With continued reference to FIG. 3C, according to one exemplary embodiment, the drilling device 72 may be stopped upon the distal end 98 of the drill bit 74 reaching the lower base flange 38. Various methods of determining when the distal end 98 of the drill bit 74 contacts the lower base flange 38 are envisioned. One exemplary method includes observing the audible difference in sound caused by drilling through different materials. For example, the rigid body 28 may be made of a first material such as concrete, while the lower base flange 38 may be made of a second material such as metal.

Figure 3D:
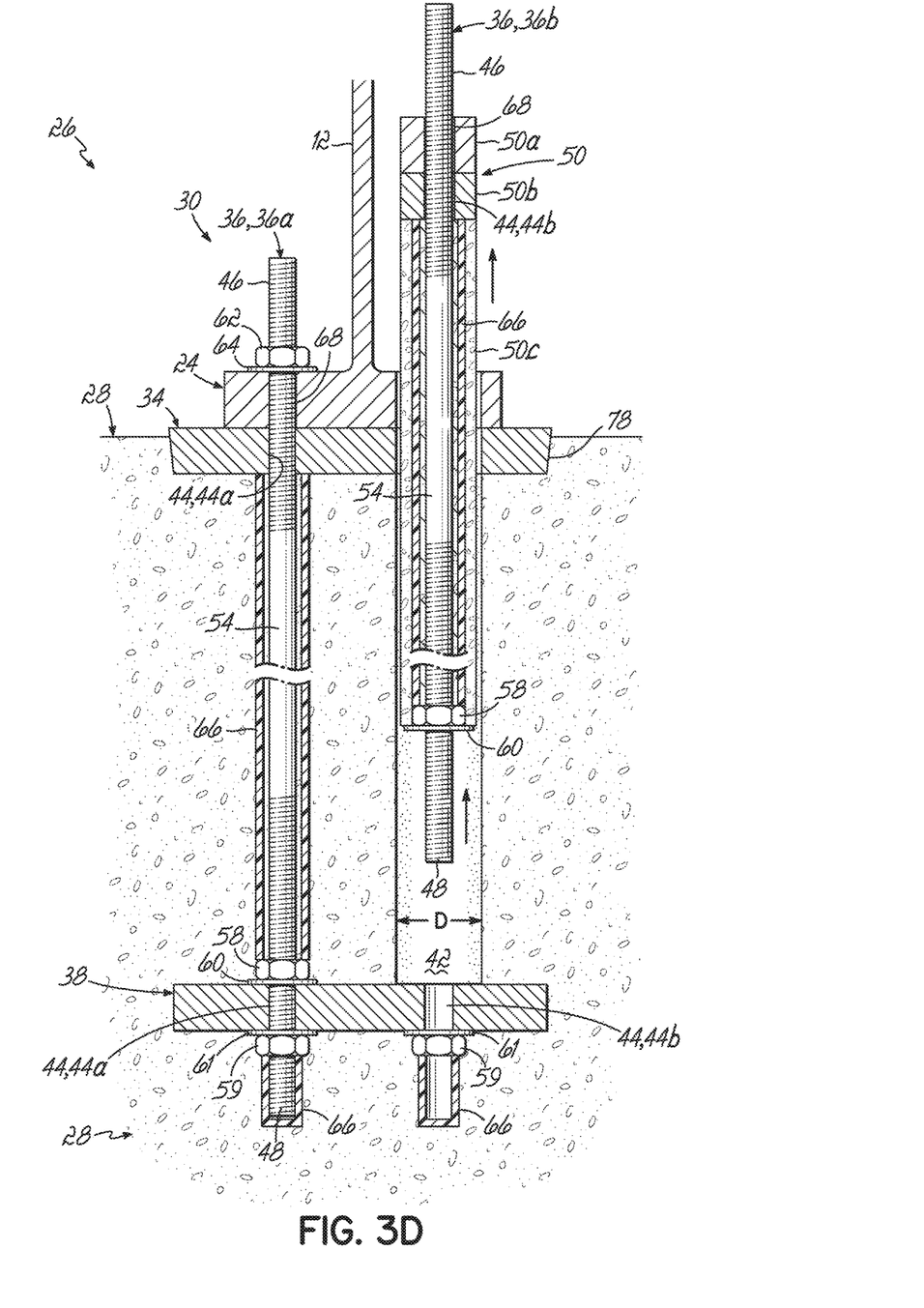
FIG. 3D is an upper radial cross-sectional view similar to FIG. 3C, showing the anchor bolt being removed from the cavity with the core according to an embodiment.

FIG. 3D shows that after determining that the lower base flange 38 has been reached, the core 50 and/or the anchor bolt 36 may be rotated and raised separating the anchor bolt 36 from the threads of the lower base nut 59. Alternatively, the anchor bolt 36 and/or the core 50 may be vertically raised to shear the internal threads (not shown) of the lower base nut 59 from the anchor bolt 36. Shearing the internal threads of the lower base nut 59 may not be necessary if the internal threads of the lower base nut 59 are already sheared or otherwise destroyed, which may have initially caused the anchor bolt 36 to be insufficiently tensioned, necessitating replacement. In the exemplary embodiment shown in FIG. 3D, the anchor bolt 36 including the upper base nut 58 and upper base washer 60 and the core 50 are raised as one unit. In these exemplary embodiments, the lower base nut 59 and the lower base washer 61 may not be removed with the core.

While not shown, according to an alternative exemplary embodiment, the drilling device 72 may extend through the lower base flange 38 if the cavity 42 is desired to be deeper.

Figure 3E:
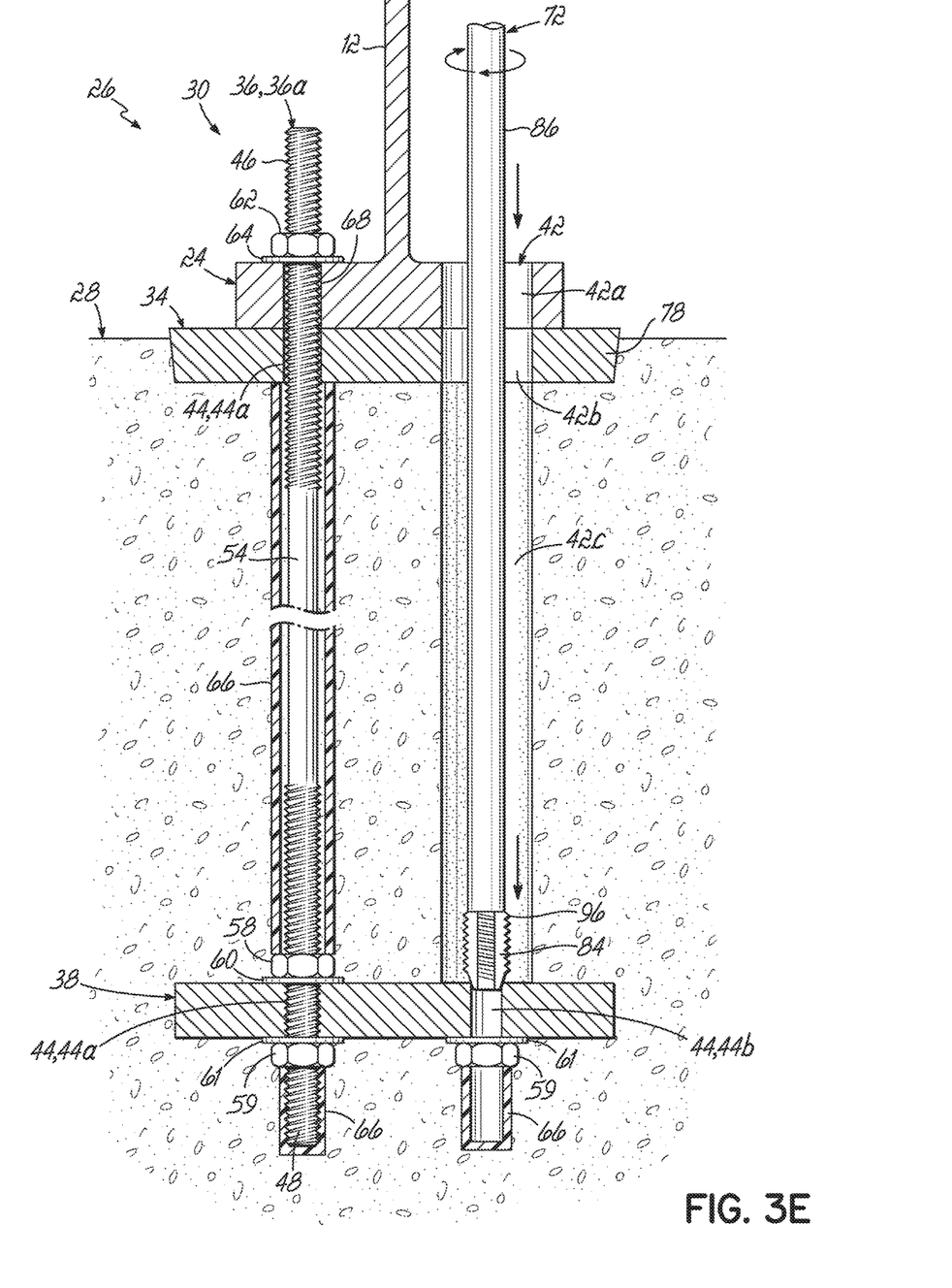
FIG. 3E is an upper radial cross-sectional view similar to FIG. 3D, showing a drilling device having a distally extending tap creating internal threads in the lower base flange.

FIG. 3E shows the cavity 42 being prepared for the insertion of a replacement anchor bolt 80. In the exemplary embodiment shown, the cavity 42 includes a lower tower flange cavity 42*a* formed in the lower tower flange 24, an upper load distribution flange cavity 42*b* formed in the upper load distribution flange 34, and a rigid body cavity 42*c* formed in the rigid body 28.

In one exemplary embodiment, a vacuum cleaner (not shown) may be used to remove dust and other material caused by the drilling device 72. An endoscope (not shown) may also be inserted into the cavity 42 to observe the cavity 42 including the lower tower flange cavity 42*a*, the upper load distribution flange cavity 42*b*, and the rigid body cavity 42*c* to determine if any other steps need to be performed prior to inserting a new anchor rod.

With continued reference to FIG. 3E, according to an exemplary embodiment, internal threads 82 may be formed into the bolt bore 44 of the lower base flange 38 using a drilling device, such as drilling device 72, with a tap 84 having external threads 96 mounted on a long drive 86. For example, the internal threads 82 may be M52 threads, resulting in a diameter of approximately 52 millimeters, while the bolt bore 44 may have a diameter of approximately 42 millimeters. After forming the internal threads 82, a vacuum cleaner (not shown) may be used to remove dust and other material in the cavity 42 and/or the bolt bore 44 according to an exemplary embodiment.

Figure 3F:
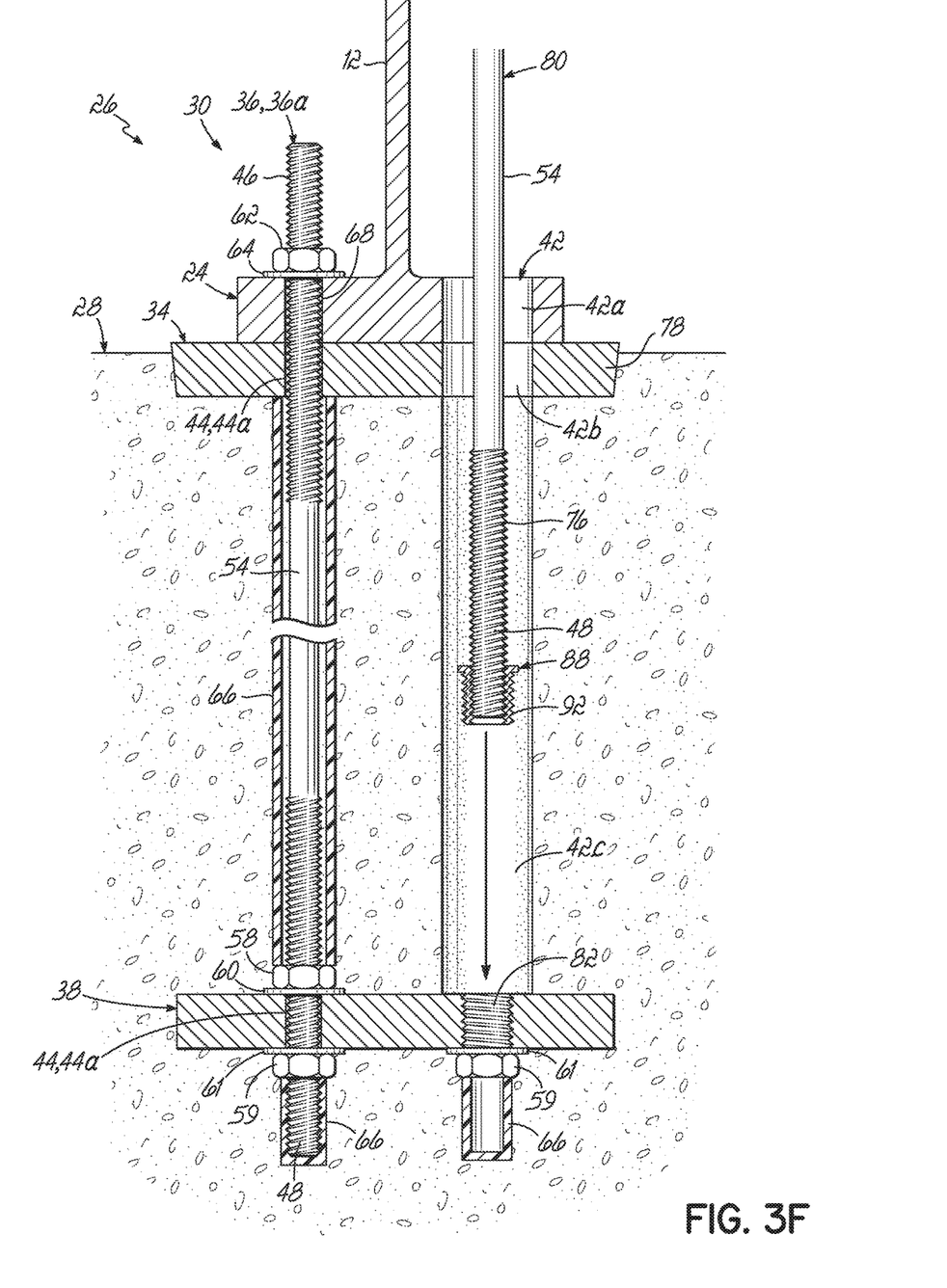
FIG. 3F is an upper radial cross-sectional view similar to FIG. 3E, showing the replacement anchor bolt rod already threadably coupled to the insert being lowered toward the lower base flange.

FIG. 3F shows an exemplary embodiment where the replacement anchor bolt 80 already coupled to an insert 88 prior to being inserted into the cavity 42 and approaching the lower base flange 38 according to one exemplary embodiment. More specifically, the internal threads 90 of the insert 88 are threadably coupled to the external threads 76 of the replacement anchor bolt 80. While a threaded coupling of the replacement anchor bolt 80, the insert 88, and the lower base flange 38 is shown and described, one skilled in the art would appreciate that other methods of coupling these components together are envisioned.

Figure 3G:
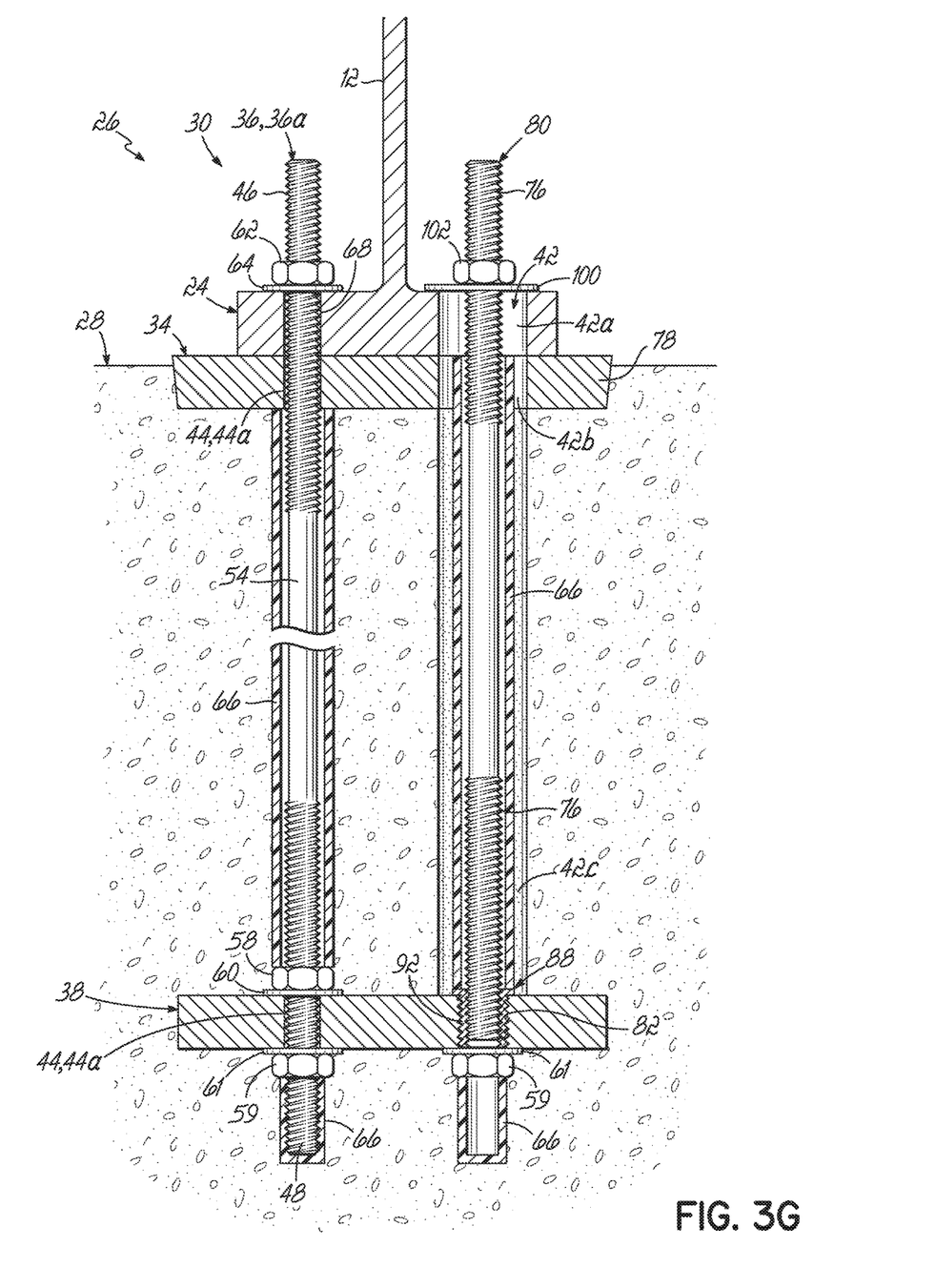
FIG. 3G is an upper radial cross-sectional view similar to FIG. 3F, showing the replacement anchor threadably coupled to the insert, and the insert threadably coupled to the lower base flange.
Figure 4:
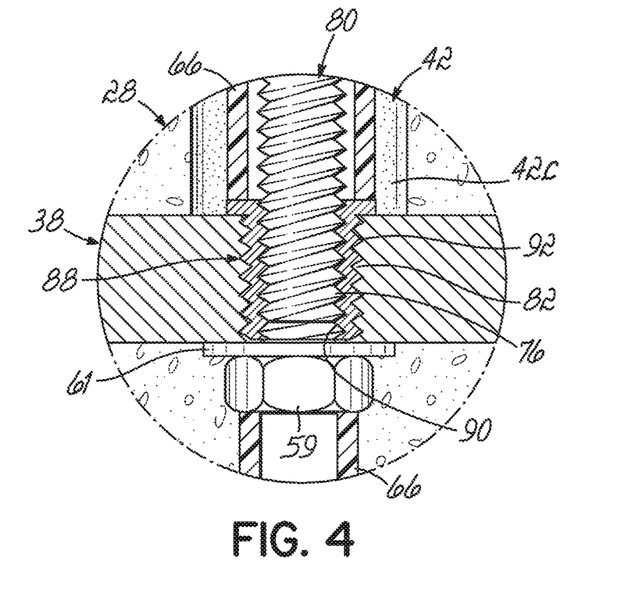
FIG. 4 is a detailed cross-sectional view of the lower base flange of FIG. 3G.
Figure 5:
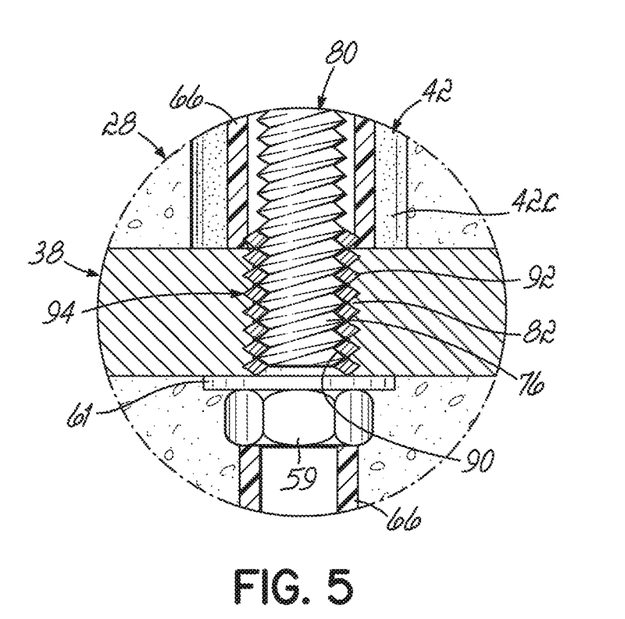
FIG. 5 is a detailed cross-sectional view of the lower base flange of FIG. 3G according to an alternative exemplary embodiment, where the insert is a helicoil.

FIG. 3G shows an exemplary embodiment, where the replacement anchor bolt 80 is threadably coupled to the inside of the insert 88, while the outside of the insert 88 is coupled to the inside of the lower base flange 38. This is shown in greater detail in FIG. 4, which is a detailed view of lower base flange 38 of FIG. 3G. According to the exemplary embodiment shown in FIGS. 3G and 4, the external threads 92 of the insert 88 are threadably coupled to the internal threads 82 of the lower base flange 38, while the internal threads 90 of the insert 88 are threadably coupled to the external threads 76 of the replacement anchor bolt 80. The insert 88 may have external threads 92 having an outer diameter (OD) of about 52 millimeters (e.g. a M52 thread). Likewise, the insert 88 may have internal threads 90 having an internal diameter (ID) of about 42 millimeters (e.g. a M42 thread). In an alternative exemplary embodiment, the insert 88 may be inserted into the cavity 42 and coupled to lower base flange 38, and thereafter, the replacement anchor bolt 80 may be inserted into the cavity 42 and coupled to the replacement anchor bolt 80. FIG. 5 shows a detailed view of an alternative exemplary embodiment of FIG. 3G, in which the insert 88 is a helicoil 94.

According to alternate embodiment, instead of using the insert 88, at least a portion of the replacement anchor bolt 80 may have a larger diameter than the original anchor bolt 36 to threadably couple the external threads 92 of the replacement anchor bolt 80 directly to the internal threads 82 of the lower base flange 38. In another exemplary embodiment, the replacement anchor bolt 80 may extend entirely through the lower base flange 38, while in another embodiment, the replacement anchor bolt 80 may extend only partially through the lower base flange 38.

While not shown, in one exemplary embodiment, once the replacement anchor bolt 80 is sufficiently coupled to the lower base flange 38 and post-tensioned to the desired torque, the cavity 42 may be filled partially or entirely with a cementitious material, such as grout. Alternatively, the cavity 42 may be filled partially or entirely with a cementitious material after the replacement anchor bolt 80 is sufficiently coupled to the lower base flange 38 and before the replacement anchor bolt 80 is post-tensioned to the desired torque. One skilled in the art would appreciate that the range of torques varies according to the particular wind turbine along with other factors. Regardless of whether cementitious material is inserted into the cavity 42, a replacement bolt washer 100 and a replacement bolt nut 102 may be inserted as shown in FIG. 3G to enclose the cavity 42 and protect the cavity 42 from the elements.

While the present invention has been illustrated by the description of various embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A method of replacing an anchor bolt used to support a wind turbine to a foundation, the method comprising:
   providing the wind turbine and the foundation supporting the wind turbine, the foundation including a lower base flange, at least one anchor bolt extending between the lower base flange and a lower tower flange of the wind turbine, and a rigid body at least partially formed around the at least one anchor bolt;
   drilling a core in the lower tower flange and the rigid body circumferentially around the anchor bolt;
   removing the anchor bolt and the core to create a cavity;
   inserting a replacement anchor bolt into the cavity;
   coupling the replacement anchor bolt to the lower base flange; and
   tensioning the replacement anchor bolt.

2. The method according to claim 1, wherein coupling the replacement anchor bolt to the lower base flange further comprises:
   coupling the replacement anchor bolt to an insert; and
   coupling the insert to the lower base flange.

3. The method according to claim 1, wherein coupling the replacement anchor bolt to the lower base flange further comprises:
   cutting internal threads into a bolt bore of the lower base flange; and
   threadably coupling external threads of the replacement anchor bolt to internal threads of an insert; and
   threadably coupling external threads of the insert to the internal threads of the lower base flange.

4. The method according to claim 2, wherein the insert is a helicoil.

5. The method according to claim 2, wherein coupling the replacement anchor bolt to the insert is performed prior to coupling the insert to the lower base flange.

6. The method according to claim 1, further comprising:
   casting the cavity with a cementitious material.

7. The method according to claim 1, wherein the tensioning step further comprises:
   inserting a replacement bolt washer and a replacement bolt nut to tension the replacement anchor bolt and enclose the cavity.

8. The method according to claim 1, wherein the foundation further comprises an anchor cage, the anchor cage including an upper load distribution flange, the lower base flange, and the plurality of anchor bolts extending therebetween and at least partially formed within the rigid body; and
   wherein the drilling step further comprises drilling the core in the lower tower flange, the upper load distribution flange, and the rigid body circumferentially around the anchor bolt until contacting the lower base flange.

9. The method according to claim 1, further comprising:
   cleaning out the cavity, prior to inserting the replacement anchor bolt.

10. The method according to claim 1, further comprising:
    determining whether an anchor bolt is sufficiently tensioned using an ultrasound device prior to drilling a core in the lower tower flange.

11. The method according to claim 1, further comprising:
    performing the recited steps without removing the wind turbine from the foundation.

12. The method according to claim 1, further comprising:
    performing the recited steps while the wind turbine is actively operating or is in a standstill mode.

13. The method according to claim 1, wherein the method is performed on at least two anchor bolts of the foundation.

14. The method according to claim 1, wherein the anchor bolt has a first longitudinal axis and the core has a second longitudinal axis, the first longitudinal axis and second longitudinal axis being coaxial during the drilling step.

15. A method of replacing an anchor bolt used to support a wind turbine to a foundation, the method comprising:
    providing the wind turbine and the foundation supporting the wind turbine, the foundation including a lower base flange, at least one anchor bolt extending between the lower base flange and a lower tower flange of the wind turbine, and a rigid body at least partially formed around the at least one anchor bolt;
    drilling a core in the lower tower flange and the rigid body circumferentially around the anchor bolt;
    removing the anchor bolt and the core to create a cavity;
    cutting internal threads into a bolt hole of the lower base flange;
    inserting a replacement anchor bolt into the cavity;
    coupling the replacement anchor bolt to the threaded bolt hole of the lower base flange; and
    tensioning the replacement anchor bolt.

16. The method according to claim 15, wherein coupling the replacement anchor bolt to the threaded bolt hole of the lower base flange further comprises:
    coupling the replacement anchor bolt to an insert; and
    coupling the insert to the threaded bolt hole of the lower base flange.

17. The method according to claim 16, wherein the insert is a helicoil.

18. The method according to claim 16, wherein coupling the replacement anchor bolt to the insert is performed prior to coupling the insert to the threaded bolt hole of the lower base flange.

19. The method according to claim 15, wherein coupling the replacement anchor bolt to the threaded bolt hole of the lower base flange further comprises:
- threadably coupling external threads of the replacement anchor bolt to internal threads of an insert; and
- threadably coupling external threads of the insert to the internal threads of the threaded bolt hole of the lower base flange.

* * * * *